United States Patent [19]

Rogers

[11] Patent Number: 4,989,676
[45] Date of Patent: Feb. 5, 1991

[54] SWEEPER SYSTEM FOR LAWN MOWING

[76] Inventor: Billy G. Rogers, Rte. 1, Box 639, Drumright, Okla. 74030

[21] Appl. No.: 464,971

[22] Filed: Jan. 16, 1990

[51] Int. Cl.[5] .............................................. A01B 31/00
[52] U.S. Cl. .................. 172/438; 172/684.5; 111/197; 56/6; 56/DIG. 12; 15/78
[58] Field of Search .................. 172/29, 199, 200, 438, 172/612, 705, 748, 766, 684.5; 111/130, 197, 901; 56/6, 7, 164, 193, 371, DIG. 3, DIG. 5, DIG. 12; 15/78

[56] References Cited

U.S. PATENT DOCUMENTS

| | | | |
|---|---|---|---|
| 1,168,713 | 1/1916 | Cummins | 56/DIG. 12 |
| 1,421,060 | 6/1922 | Brook | 172/468 |
| 1,566,194 | 12/1925 | Freeman | 15/78 |
| 1,674,306 | 6/1928 | Shaw | 15/78 |
| 1,801,016 | 4/1931 | MacGregor | 15/79 R |
| 2,300,192 | 10/1942 | Allen | 15/78 |
| 2,474,418 | 6/1949 | Graves et al. | 37/118 A |
| 2,973,535 | 3/1961 | Olay | 15/78 |
| 3,525,201 | 8/1970 | Kaufman | 56/7 |
| 4,747,174 | 5/1988 | Hightower | 15/78 |

Primary Examiner—Randolph A. Reese
Assistant Examiner—Jeffrey L. Thompson
Attorney, Agent, or Firm—Head and Johnson

[57] ABSTRACT

An improved sweeper system for use with a grass mowing machine for use in the care of golf course greens in which the lawn mowing machine has at least one mower assembly, the sweeper system including a sweeper structural support affixed to and extending from the mower assembly, an elongated broom having a horizontal head portion and bristles downwardly extending therefrom, an elongated structural head member affixed to the broom head portion, a cylindrical vertical shaft extending upwardly from the structural head member, a bearing trunnion affixed to the structural support member adjacent the outer end the shaft being rotatably received in the bearing trunnion and a plurality of spacers received on the shaft above the trunnions so that the elevation of the brush is adjustable and elastomeric members extending from the sweeper system to the structural head member on either side of the structural support, the broom following behind the mower assembly to sweep the golf green as it is mowed.

4 Claims, 3 Drawing Sheets

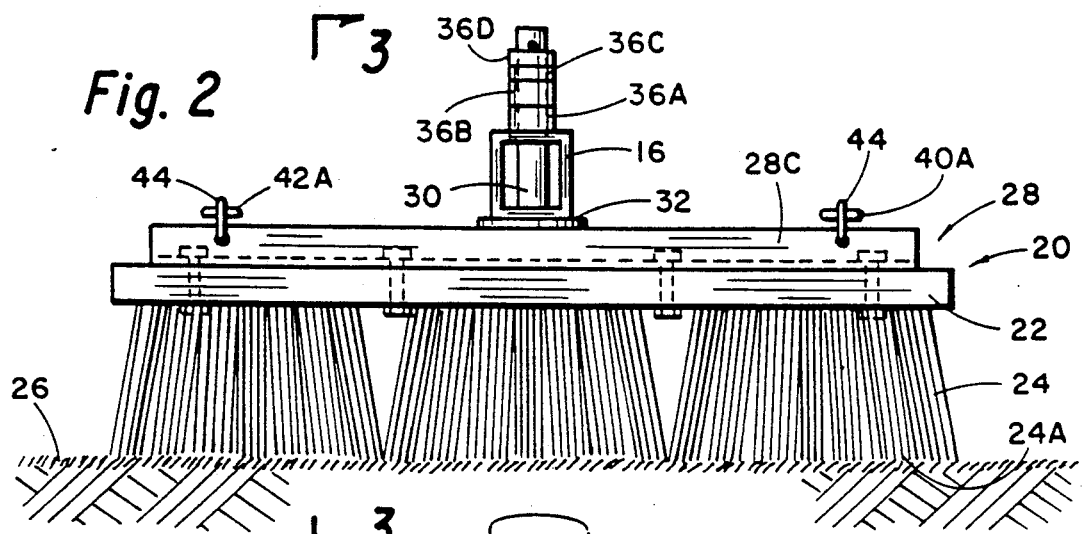
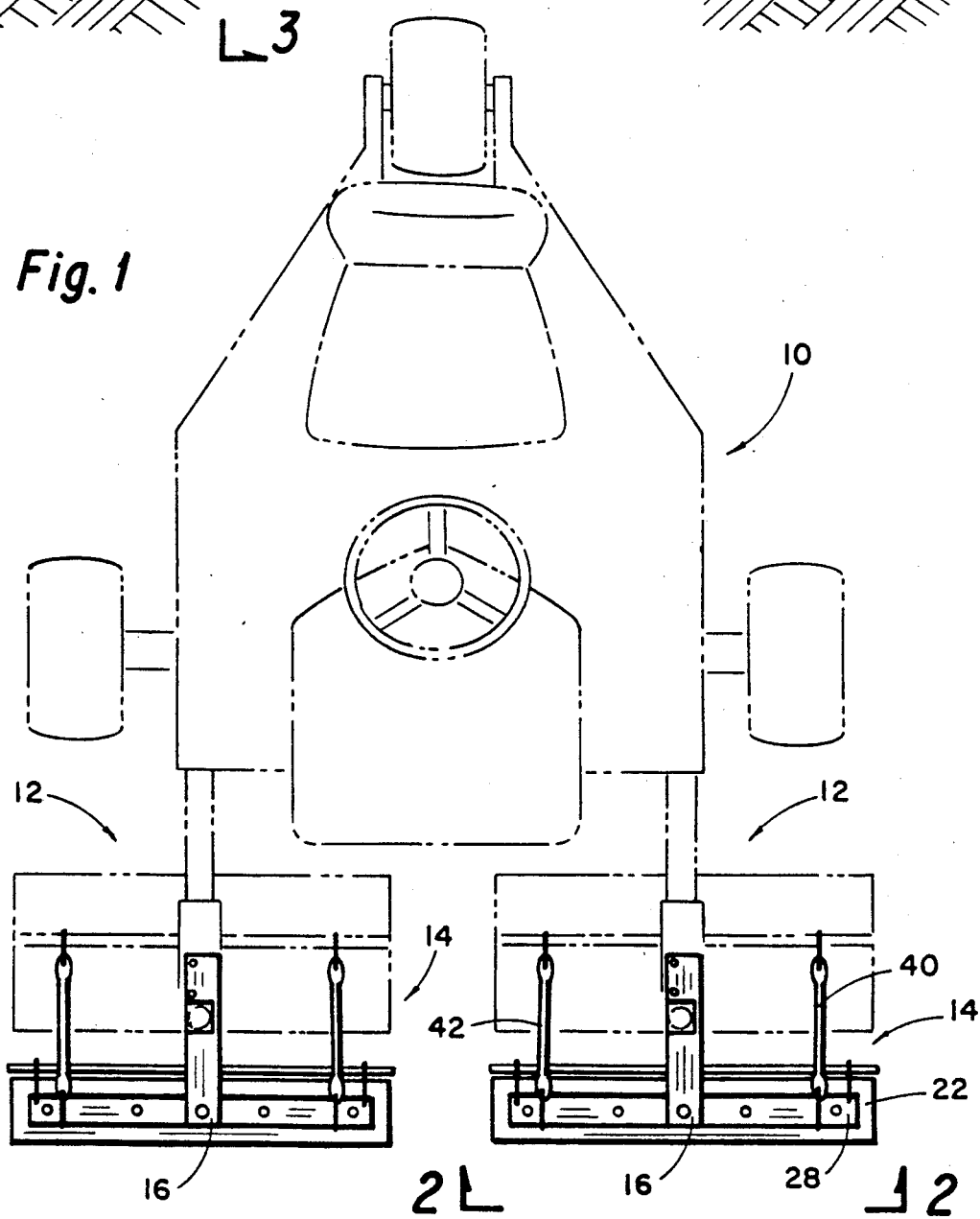

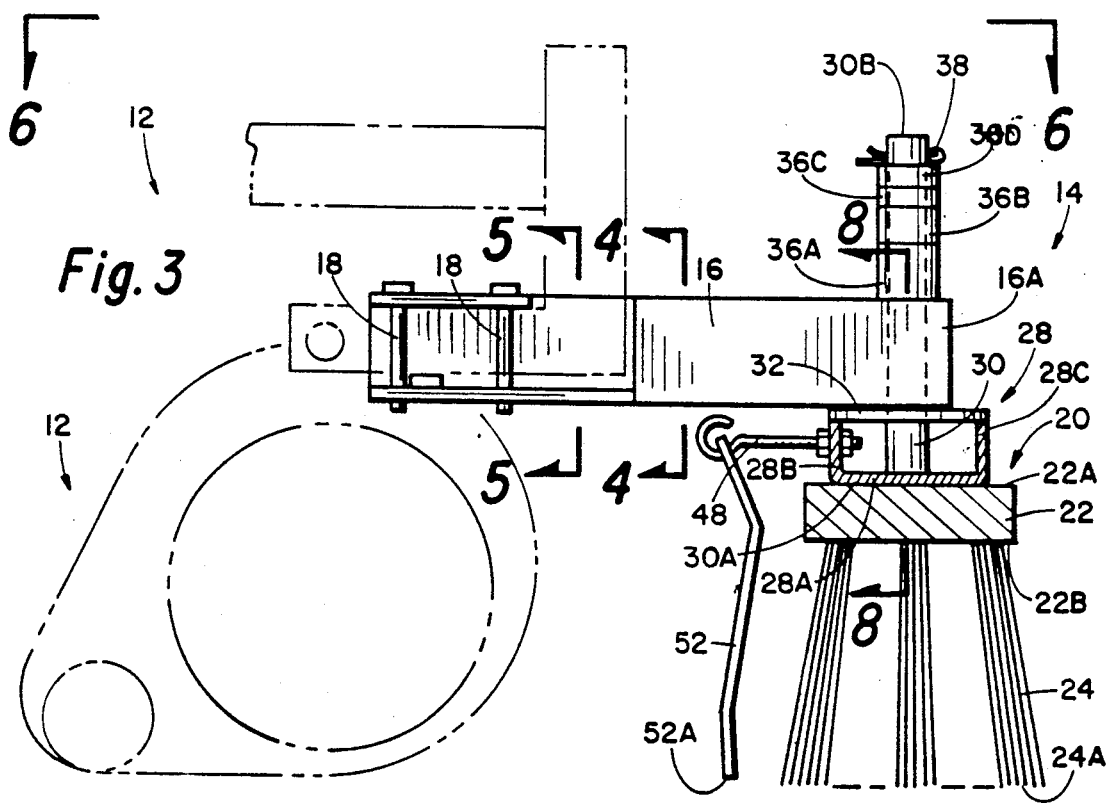
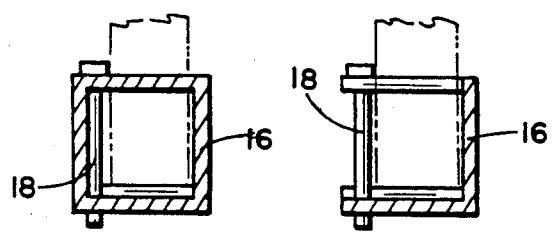
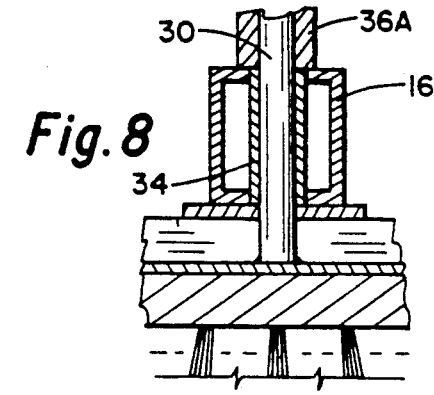
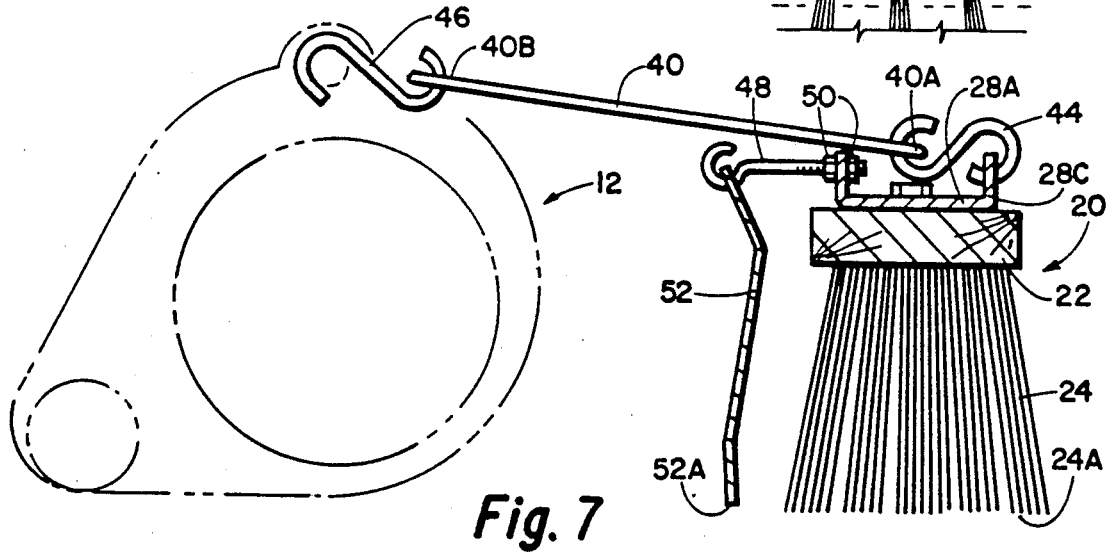

SWEEPER SYSTEM FOR LAWN MOWING

SUMMARY OF THE INVENTION

In order to provide good playing surfaces, gold course greens must be frequently mowed. In addition to frequent mowing, an improved playing surface is achieved when fine said is spread on a green. The sand settles into grass growing on the green and forms support and aeration and provides an overall improved consistent playing surface. However, spreading sand to uniformly distribute it on a green is time consuming with existing equipment.

In addition to controlling the height of grass growing on a green, it is important that the surfaced be as uniform as possible. For this reason, a common practice is to sweep a golf course green after it has been mowed. Sweeping is particularly important if the green has ben recently sanded to be sure that no ridges of sand exist to interfere with the roll of a gold ball.

A common means of taking care of a golf course green is first to mow the green utilizing a mowing machine with one, fur usually a plurality of mower assemblies pulled by a tractor. Greens are usually mowed with a reel-type mower. AFter mowing, it is frequently necessary to brush down the greens to make sure that the playing surface is free of obstructions.

Sweeping a gold course green after it has been mowed is a time consuming process, and, therefore, is an important cost factor in gold course maintenance.

The present disclosure is a device for sweeping a gold course green concurrently with mowing the green.

SUMMARY OF THE INVENTION

The present invention is for an improved means of sweeping a gold course green concurrently with mowing the green to thereby perform two functions concurrently. The improved sweeper system of this disclosure is for use with a grass mowing machine having at least one mower assembly. Affixed to and extending horizontally and rearwardly of the mowing assembly is a sweeper structural support member which can be in the form of square tubing. Supported to this structural member is an elongated broom having a horizontal headboard with bristle downwardly extending from it. An elongated structural head member, which can be very effectively made from a metal channel member, is affixed to the broom headboard.

A cylindrical vertical shaft is affixed to and extends upwardly from the structural head member. A bearing trunnion is affixed to the sweeper structural support member adjacent the outer end thereof, and this trunnion rotatably receives the vertical shaft.

The broom is elevationally positioned with respect to the structural support member by means of spacers received on the vertical shaft above the bearing trunnion.

A first elastic member is secured between the structural head member and the mower assembly at one side of the structural support member, and a second elastic member is secured between the stuctural head member and the mowing assembly on the opposite side of the structural support member. The elastic members serve to allow a degree of pivotation of the broom with respect other structural support member while restraining the broom to a position which is generally parallel to the sweeper assembly to which it is attached.

An elongated relatively thin pivotally supported guard member, made out of metal or stiff plastic, is affixed to the broom. The guard member has a lower edge which is substantially in the same horizontal plane as the bottom of the broom bristles. The guard member helps shield the brush from the impingement of grass thereon cut by the mower assembly and allows ht cut grass to be more evenly deposited on the green.

For reference to grass mowing assemblies similar to those of the present disclosure see prior U.S. Pat. Nos. 1,421,060; 1,566,194; 1,674,306; 1,801,016; 2,474,418; 2,973,535 and 4,747,174.

A better understanding of the invention will be obtained from the following description of the preferred embodiment, taken in conjunction with the attached claims and drawings.

DESCRIPTION OF THE DRAWINGS

FIG. 1 is top plane view of a grass mowing machine having two mower assemblies, all of which is housed in dotted outline, and showing the improved sweeper system of this disclosure attached to both of the mower assemblies.

FIG. 2 is a rear elevational view as taken along the 2—2 of FIG. 1 of one of the sweeper systems.

FIG. 3 is an elevational cross-sectional view taken along the line 3—3 of FIG. 2, showing a portion of the mower assembly in dotted outline and showing the improved sweeper system.

FIG. 4 is a cross-sectional view taken along the line 4—4 of FIG. 3, showing the sweeper structural support member primarily in cross-section.

FIG. 5 is a cross-sectional view taken along the line 5—5 of FIG. 3, showing more details of the sweeper structural support member.

FIG. 7 is a vertical elevational view taken along the line 7—7 of FIG. 6 showing a mower assembly and the improved sweeper system and showing the location and means of attachment of an elastic member as used in the sweeper system.

DESCRIPTION OF THE PREFERRED EMBODIMENT

Figure 6:
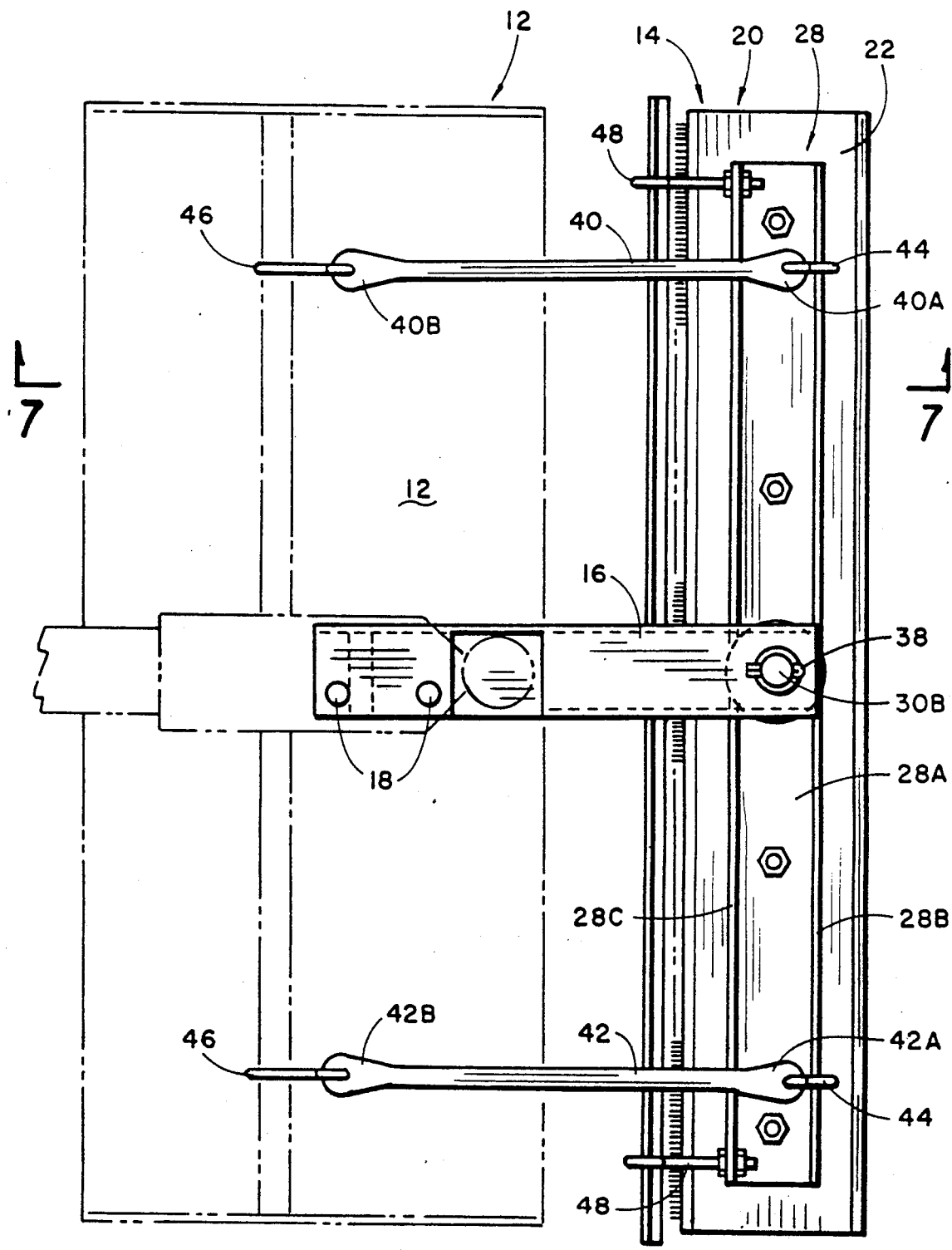
FIG. 6 is a top plane view of a sweeper assembly and the improved sweeper system secured to it.

Referring to the drawings and first to FIG. 1, a grass mowing machine typically used to mow a golf course green is generally indicated by the numeral 10, the machine 10 being primarily in the form of a tractor. Pulled by the grass mowing machine 10 are two mower assemblies, generally indicated by the numeral 12, each shown in dotted outline. The present disclosure is directed to a sweeper system attached to each of the mower systems, the sweeper system of this disclosure being generally indicated by the numeral 14.

By referring to FIGS. 2-8, details of the improved sweeper system of this disclosure are best understood. Affixed to and extending generally horizontally and rearwardly of each of the mower assemblies is a sweeper structural support member 16. This member is shown in the form of a length of square tubing which is held to structural portions of the mower assembly by means of bolts or pins 18, as shown in FIGS. 3, 4 and 5. The exact manner by which the sweeper structural support member 16 is affixed to a mower assembly 12 is not important since such will depend upon the details of construction of the mower assembly. The function of the sweeper structural support member 16 is to provide a support for the sweeper system 14.

As shown in FIGS. 2, 3 and 7, each sweeper assembly includes a broom, generally indicated by the numeral 20. Each broom consists of a horizontal headboard 22 having an upper surface 22 and a lower surface 22B. Affixed to the headboard 22 and extending downwardly from lower surface 22B are bristles, 24, the bristles having a lower sweeping edge 24A. Broom 20 is supported so that the lower sweeping edge 24A of the bristles is in slightly contact with the upper surface 26 of a gold green.

Secured to the board upper surface 22A is an elongated structural head member 28 which is preferably, as shown, in the form of an open top metal channel, the channel having a flat base surface 28A nd opposed upstanding integral edge portions 28B and 28C.

Affixed to and extending upwardly from the flat base portion 28A of the structural head member is a cylindrical shaft 30. The shaft lower end 30A is preferably welded to the stuctural head member flat base portion 28A. In addition, to add rigidity to the connection of the lower end 30A of the shaft, a short length plate 32 is used. The plate is typically as wide as the sweeper stuctural support member 16 and, therefore, is not seen in the top views of FIGS. 1 and 6.

Shaft 30 is rotatably received by the sweeper stuctural support member 16 adjacent its outer end 16A. the means of rotatably interconnection shaft 30 with the sweeper stuctural support plate 16 may be accomplished in a variety of ways. In one way, the structural support member is formed of square cross-sectional tubing which has an opening in the top and bottom surface thereof, the opening functioning as a bearing trunnion arrangement. In FIG. 8 a short length tubular trunnion member 34 is received in an opening in the sweeper stuctural support member 16 to provide a bearing relationship between the sweeper structural support member 16 and the shaft 30.

Shaft 30 is longer than necessary to reach the upper edge of the sweeper structural support member 16 to allow for the placement of a plurality of tubular spacers 36, four such spacers 36A-36D being illustrated. The spacers maybe of varying length and numbers as shown, so that the elevational position of brush 20 and, particular, the bristles lower sweeping edge 4A is adjustable with respect to the sweeper structural support member 16. Adjacent the top end 309B of the shaft is a cotter key 38 to retain the shaft within the spacers 36.

Two elastic members 40 and 42 are employed with each sweeper system 14, as shown best in FIGS. 6 and 7. One end 40A of each elastic member 40 is affixed to the structural head member 28 by means of an S-clamp 44 extending through an opening through the structural member. The elastic member other end 40B is secured to the mower assembly 12 also by means of an S-clamp. Elastic member 40 is spaced from one side of the sweeper stuctural support member 16, while the other elastic member 42 is spaced onthe opposite side, that is, elastic member 40A is adjacent one end of the broom 20 and elastic member 42 is adjacent the other end of the broom. Elastic members 40 and 42 allow broom 20 to pivot about shaft 30 while generally retaining the sweeper system 14 in proper orientation relative to mower assembly 12. The elastic members 40 and 42 may typically be formed of a commercial product commonly referred to as a "bungie cord" or the elastic members may be made of springs.

Extending forwardly of the stuctural head member edge portion 28B are two hooks 48, held in place by nuts 50. Pivotally extending downwardly from hooks 48 is a thin elongated shelf 52. The shield lower end 52A is even with or slightly above in elevation the bristle lower sweeping edge 24A. Shield 52 may be made of metal or stiff plastic and functions to protect brush 20 against accumulation of grass thereon as kicked out by mower assembly 12.

The sweeper system as herein described improves the characteristics of golf course greens without requiring additional maintenance steps. This improvement is particularly advantageous in mowing and dressing greens having sand intermixed with the grass.

The claims and the specification does give the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirits and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. For a grass mowing machine used in the care of golf course greens in which the grass mowing machine has at least one mower assembly forming a part thereof, an improved sweeper system, comprising:

a sweeper stuctural support member having a forward end and a rearward end and having the forward end affixed to a mower assembly, the sweeper structural support member extending generally horizontally from the sweeper assembly;

an elongated broom having a horizontal headboard with a top and bottom surface and bristles extending downwardly form said bottom surface;

an elongated stuctural head member affixed to said broom headboard top surface and having opposed outer ends;

a cylindrical vertical shaft having a lower and an upper end, the lower end being affixed to said structural head member at a point intermediate said outer ends thereof, the shaft extending in the direction opposite said broom bristles;

a bearing trunnion affixed to said stuctural support member adjacent said rearward end thereof and rotatably receiving said shaft;

means to rotatably secure said shaft to wide structural support member;

means to elevationally position the spacing of said broom relative to said structural support member;

a first elastic member having a forward end and a rearward end, the forward end being secured to the mower assembly and the rearward end being secured to said structural head member adjacent one of said outer ends thereof; and a second elastic member having a forward end and a rearward end, the forward end being secured to the mower assembly and the rearward end being secured to said structural head member adjacent the other of said ends thereof.

2. An improved sweeper system according to claim 1 wherein said elongated structural head member is in the form of a structural metal channel having a flat base portion contiguous to said broom head portion and opposed upstanding flange portions.

3. An improved sweeper system according to claim 1 wherein said means to elevationally position said broom relative to said support structure member includes a plurality of pacer washers received on said shaft above said bearing trunnion, the number and thickness of the spacer washers being selectably variable.

4. An improved sweeper system according to claim 1 wherein said first and second elastic members are in the form of elongated elastomeric bands.

* * * * *